United States Patent [19]

Hayashi

[11] Patent Number: 4,994,293
[45] Date of Patent: Feb. 19, 1991

[54] METHOD FOR ROLLING CROISSANT DOUGH PIECES

[75] Inventor: Torahiko Hayashi, Nozawa, Japan

[73] Assignee: Rheon Automatic Machinery Co., Ltd., Utsunomiya, Japan

[21] Appl. No.: 439,115

[22] Filed: Nov. 17, 1989

Related U.S. Application Data

[62] Division of Ser. No. 64,070, Jun. 18, 1987, Pat. No. 4,905,583.

[30] Foreign Application Priority Data

Jun. 18, 1986 [JP] Japan .............................. 61-142508
Jul. 15, 1986 [JP] Japan .............................. 61-165766

[51] Int. Cl.⁵ ............................................. A21D 6/00
[52] U.S. Cl. ..................................... 426/501; 426/512
[58] Field of Search .............. 426/501, 502, 503, 512; 99/450.2, 353, 450.1; 425/321, 335

[56] References Cited

U.S. PATENT DOCUMENTS 2,735,382  2/1956  Hansen .............................. 426/501
4,600,595  7/1986  Svengren et al. ................... 426/501

Primary Examiner—George Yeung
Attorney, Agent, or Firm—Guy W. Shoup; David W. Heid

[57] ABSTRACT

An apparatus and method for rolling croissant dough pieces are provided. Dough pieces are fed between a pair of rollers with the surface of at least one roller being adhesive to the dough piece and transferred to an endless belt device via a transfer roller of a small diameter and high speed rotation for peeling off the dough piece from the roller. Then the dough pieces are carried under a rolling up device to be rolled into croissant rolls. The dough pieces are transferred to the endless belt maintaining at least one surface of it adhesive, and so the dough rolls produced are wound tightly due to the dough surfaces adhering to each other.

2 Claims, 2 Drawing Sheets

METHOD FOR ROLLING CROISSANT DOUGH PIECES

This application is a division of application Ser. No. 07/064,070, filed Jun. 18, 1987, now U.S. Pat. 4,905,583.

1. FIELD OF THE INVENTION

This invention relates to an apparatus and method for rolling up croissant dough pieces and particularly to an apparatus and method for rolling up croissant dough pieces without an operational error and at minimum costs.

2. DESCRIPTION OF PRIOR ART

U.S. Pat. No. 2,677,334 teaches a pressure board for a bread dough moulding machine, in which a first endless belt device receiving the dough piece passed between presheeting rolls, a second endless belt device positioned below the first endless belt device, a curling screen positioned above the second endless belt device and a transfer plate for transferring the dough from the first endless belt device to the second endless belt, are provided.

In this apparatus the dough piece provided on the first endless belt device passes over the transfer plate. Then the dough piece is recieved on the second endless belt device, which carries the dough piece under the curling screen thereby rolling it into a roll. In this apparatus the surface of the endless belt is provided with flour powder to prevent the dough piece from adhering to the belt surface so that the dough piece can be transferred through the endless belt devices and roller pairs smoothly. Thus, both surfaces of the dough, which contacts the flour on the endless belt and roller pairs, loses its adhesiveness, and this loss is disadvantageous in that the surfaces do not stick to each other, and this result in the dough roll being wound loosely. Additionally, such a dough roll is readily loosened afterwards.

U.S. Pat. application No. 867,815, now U.S. Pat. No. 4,741,263 assigned to the same assignee of this application, teaches an apparatus and method for producing croissants in which a dough piece rolling up mechanism having a lower endless belt device and an upper endless belt device, a feeding endless belt device, a pair of vertically juxtaposed rollers positioned between the rolling up mechanism and the feed conveyor and a roller of a small diameter being adjacent the peripheral surface of the lower roller and rotated faster in its peripheral speed than the peripheral speed of the lower roller are provided.

In this apparatus, a tip of the dough piece reaching the upstream end of the lower endless belt device is detected by a sensor and rolled into a roll by narrowing the gap between the upstream ends of the endless belt devices. But to do such an operation at least a sensor, means for lowering and raising the endless belt, and a control unit to activate the lowering and raising means to cooperate with the sensor, are required, and such a construction makes the apparatus complicated and expensive.

3. SUMMARY OF THE INVENTION

It is an object of the present invention to provide an apparatus and method for rolling croissant dough pieces. It is another object of the present invention to provide an apparatus and method for rolling croissant dough pieces, completely avoiding errors in rolling up.

It is a further object of the present invention to provide an apparatus and method for rolling croissant dough pieces accurately and tightly without loosening or producing irregular rolls, using a simple configuration.

In one aspect of the present invention an apparatus for rolling croissant dough pieces is provided, comprising (a) a pair of vertically juxtaposed rollers for feeding dough pieces therebetween, spaced apart from each other by a distance shorter than the thickness of the dough piece and moving in the same direction where they face each other.

(b) an endless belt device positioned downstream of said pair of rollers, (c) a rolling up device positioned above the upper flight of said endless belt device, and (d) a transfer roller of a small diameter each said transfer roller being downstream of and adjacent one of said pair of rollers and being rotated in the direction of the movement of the dough piece and faster in its peripheral speed than the peripheral speed of said rollers.

In another aspect of the present invention, a method for rolling croissant dough pieces is provided comprising (a) feeding a dough piece, with the base of the triangle of the dough piece as the leading end and positioned perpendicular to the feeding direction, between a pair of vertically spaced apart rollers while the surface of one of said pair of rollers is maintained to be adhesive to the dough piece (b) transferring said dough piece from between said pair of rollers to an endless belt device positioned downstream of said pair of rollers through a transfer roller of a smaller diameter positioned between said pair of rollers and said endless belt device rotating in the same direction of the movement of the dough piece and faster in its peripheral speed than the peripheral speed of said pair of rollers, and (c) rolling up said dough piece by a rolling up device positioned on said endless belt device.

In a still further aspect of the present invention a method for rolling croissant dough pieces is provided comprising (a) feeding a triangular dough piece, with the base of the triangle of the dough piece as the leading end positioned perpendicular to the feeding direction, to a pair vertically spaced apart rollers and compressing it therebetween while the surface of one of said rollers is maintained to be adhesive to the dough piece, (b) transferring said dough piece from between said pair of rollers through a transfer roller of a small diameter of a higher peripheral speed than the peripheral speeds of said pair of rollers, to an endless belt device spaced apart from said pair of rollers so that the distance between the point where said pair of rollers are the closest to each other and the upstream end of said endless belt device is shorter than the length of the dough piece measured in the feeding direction, the belt of said endless belt device moving faster than the peripheral speed of said pair of rollers, and (c) rolling up said dough piece on said endless belt device.

In the invention, the transfer roller is provided adjacent at least one of the pair of the upper and lower rollers, and the dough pieces are readily and accurately peeled off from the roller and transferred to the endless belt device. Additionally, the surfaces of the rollers and the upper flight of the endless belt need not be covered by flour powder to transfer the dough pieces smoothly. The dough pieces carried in the apparatus have at least one surface adhesive. Therefore, the surfaces adhere to each other when the dough pieces are rolled, resulting in a croissant dough roll wound tightly as well as preventing loosening afterwards.

PREFERRED EMBODIMENTS OF THE INVENTION

The preferred embodiments of the present invention will now be described by reference to the drawings.

Figure 1:
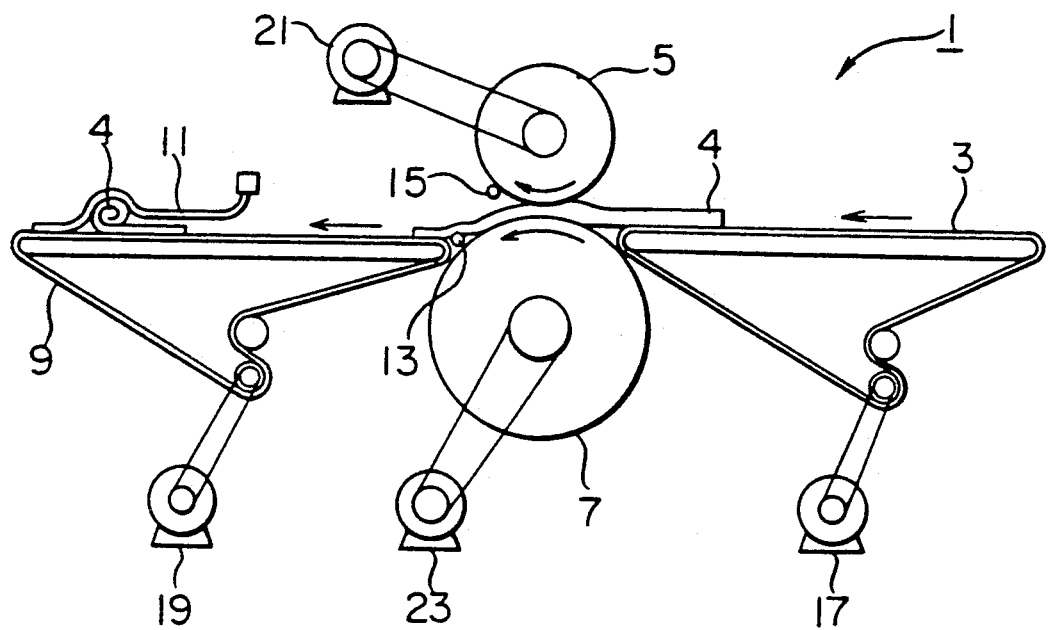
FIG. 1 is a schematic illustration showing the feeding and rolling of dough pieces, in a first embodiment of the present invention.

In FIG. 1 an apparatus for rolling croissant dough (1) of a first embodiment is shown, comprising a first endless belt device (3) for feeding dough pieces (4), a pair of vertically juxtaposed rollers consisting of an upper roller (5) and a lower roller (7) arranged downstream of the first endless belt device (3). A second endless belt device (9) is provided downstream of the pair of rollers (5, 7) and a flexible screen (11) of cloth or metal net is suspended from a holder spaced apart from and above the second endless belt device (9) as a rolling up device for rolling dough pieces. The upper roller (5) and the lower roller (7) are positioned vertically spaced apart from each other by a distance shorter than the thickness of dough pieces to press the dough piece between them. A lower transfer roller of a small diameter (13) is provided between the lower roller (7) and the upstream end of the second endless belt device (9) with the lower transfer roller (13) contacting or adjacent the peripheral surface of the lower roller. Similarly an upper transfer roller of a small diameter (15) is provided between the upper roller (5) and the upstream end of the second endless belt device (9) with the transfer roller (15) contacting or adjacent the peripheral surface of the upper roller (5). Since the lower transfer roller (13) is provided to peel off and transfer dough pieces adhering to the peripheral surface of the lower (7), it is preferable that the transfer roller (13) is designed to have a surface area as small as possible to avoid adhering to the dough pieces. It has been found that the transfer roller should have a diameter of one-fourth the length of the dough piece in the feeding direction, at maximum, to attain a reliable peeling off operation. The upper transfer roller (15) is provided to peel off and transfer dough pieces adhering to the peripheral surface of the upper roller (5) and its construction and function are the same as those of the lower transfer roller (13).

The first endless belt device (3) and the second endless belt device (9) are driven by driving motors (17, 19) respectively and the upper and lower rollers (5, 7) are driven in the same direction where they face each other by driving motors (21, 23) respectively. The lower transfer roller (13) and the upper transfer roller (15) are driven by their repective driving motors (not shown) to rotate in the direction of movement of the dough pieces, which direction is the same as that of the movement of the upper and lower rollers (5, 7) where they face each other, with the speed faster than the peripheral speed of the rollers (5, 7).

The operation of rolling the croissant dough piece will now be described in detail. A triangular croissant dough piece (4) on the first endless belt device (3) is fed into the space between the upper roller (5) and the lower roller (7) with its base of the triangle as or leading end. Since the rollers are vertically positioned by a distance shorter than the thickness of the dough piece (4), the dough piece (4) is stretched by pressure from the rollers (5, 7) when they pass between them.

In this apparatus, flour powder is not provided on the peripheral surfaces of the rollers (5, 7). Thus the doughpiece (4) is carried by the rollers (5, 7) while adhering to the surfaces when it is stretched. Without flour powder, the dough piece (4) would adhere to the surface of either of the rollers, for example, the lower roller (7), and is carried forward. However, when the dough (4) reaches and contacts the lower transfer roller (13) rotating at a speed higher than the peripheral speed of the lower roller (7), the leading tip of the dough piece (4) is peeled off from the roller surface and transferred to the second endless belt via the lower transfer roller (13).

To ensure a reliable peeling off operation, it is found that the transfer roller (13) is also preferably designed to have a diameter of one-fourth or less the lenght of the dough piece (4) measured in the feeding direction and be driven faster in its peripheral speed than the peripheral speeds of the upper and lower rollers (5, 7). Where the transfer roller (13) does not have the diameter and rotating speed described above, and particularly where the transfer roller (13) is driven more slowly than the peripheral speed of the pair of upper and lower rollers (5, 7), the dough pieces (4) becomes stagnant when it reaches the transfer roller (13) and adheres to its peripheral surface. Otherwise, if the transfer roller (13) has a diameter larger than one fourth the lenght of the dough piece (4), it has a relatively large surface area resulting in the dough piece sticking to its own surface. Therefore the dough piece (4) cannot be transferred to the second endless belt device (9).

Regarding the upper transfer roller (15), the same peel off operation takes place at the upper transfer roller (15). Thus it is designed to have similar conditions as those of the lower transfer roller (13) regarding the diameter and the peripheral speed.

Then the dough (4) is carried on the second endless belt device (9) onto the flexible screen (11). Since the second endless belt device (9) is not provided with flour powder either, the lower side surface of the dough piece (4) is adhesive to the upper flight surface of the second endless belt device (9). As is well known in the art, the flexible screen (11) is positioned above the upper flight of the second endless belt device (9) suspended from a horizontal holder positioned transversely of and spaced apart from the endless belt device, the holder being supported on both ends by standing arms. The dough piece (4) carried under flexible screen (11) is curled up by the screen from its leading tip. Since the upper flight surface of the dough is not covered with flour powder, the lower surface of the dough piece (4)

is kept adhesive. When the dough begins to curl up, the leading tip of the dough is caught by the screen securely by adhering to the surface of the screen (11) and is rolled up tightly with its surfaces sticking to each other due to their adhesiveness. Moreover, because the surfaces of the dough pieces stick to each other, once the dough piece (4) is rolled up, the dough roll hardly loosens. When the dough piece (4) is completely rolled up, it exits from the space between the screen (11) and the upper flight surface.

In this first embodiment, the upper flight of the second endless belt device (9) is driven to move faster than the peripheral speed of the pair of upper and lower rollers (5, 7) and is positioned near the pair of upper and lower rollers (5, 7) at a position where the distance between the upstream end of the second endless belt device (9) and a point where the pair of the rollers (5, 7) are the closest is shorter than the lenght of the dough piece measured in the feeding direction. When the croissant dough piece (4) of a triangular shape, fed with its base as a leading end, passes between the pair of rollers (5, 7) and is transferred to the second endless belt (9) via the transfer rollers (13, 15), the top of the triangle is held between the pair of rollers (5, 7) while its base portion is located on the second endless belt device (9). Since the upper flight of the second endless belt (9) moves faster than the peripheral speed of the pair of rollers (5, 7) the dough piece is pulled by the second endless belt device (9) in the moving direction of the upper flight of the second endless belt device while the top of the triangle is held between the rollers (5, 7). The croissant dough piece (4) is fed to the rollers (5, 7) and the second endless belt device (9) with its base of the triangle perpendicular to the moving direction to prevent the dough piece from being rolling up irregularly. That is, to form a regular croissant roll, it is important to bring the base of the triangle of the dough piece to form the axis of the roll. If the base of the triangle is not positioned perpendicularly to the moving direction of the dough piece, the dough piece will result in a distorted spindle-form roll unsuitable for eating. However, in this apparatus, even when the dough (4) is positioned aslant and the base of the triangle is not positioned perpendicularly to the moving direction of the endless belt, the position of the dough piece (4) is corrected by the pulling at the base so that the line from the top to the center of the base of the triangle is aligned with the moving direction of the second endless belt device (9). The faster driven second endless belt device (9) imparts force to the dough piece so as to correct its orientation.

Figure 2:
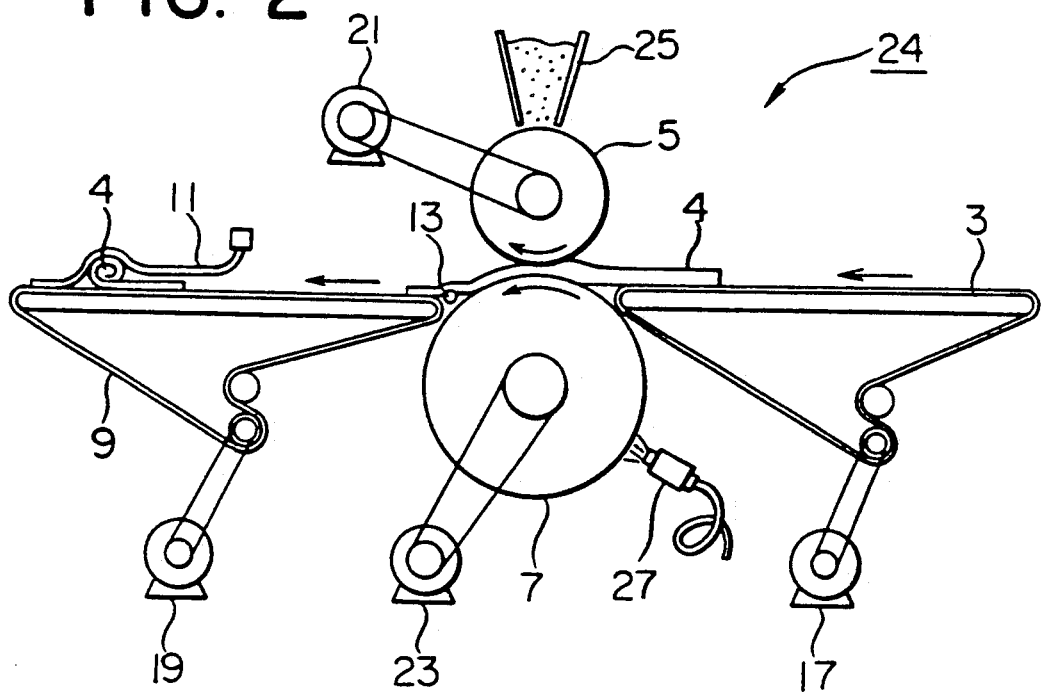
FIG. 2 shows a schematic illustration showing the feeding and rolling of dough pieces in a second embodiment of the present invention.

In FIG. 2, a second embodiment of the apparatus (24) for rolling croissant dough pieces of the present invention is shown. The members of the apparatus are the same as those of the members in FIG. 1 having their corresponding reference numbers, and the apparatus is the same as that in FIG. 1 except that flour supply means (25) to provide flour powder on the surface of the upper roller (5) and water supply means (27) to provide water on the surface of the lower roller are included and the upper transfer roller (15) is removed. The flour supply means (25) is a hopper storing flour located above the upper roller (5) and provides the flour to the surface of the upper roller (5) continuously or intermittently. The water supply means (27) is a spray for wetting the surface of the lower roller to increase the adhesiveness of the dough piece (4).

In this apparatus, only the lower side surface of the dough piece (4) is kept adhesive and the adhesiveness is increased by water sprayed from the water supply means (27). So long as one side surface of the dough piece is adhesive, the dough piece is roller tightly with its surfaces sticking to each other when the dough piece is roller up. In this embodiment, only the lower transfer roller (13) is provided and only the lower side surface of the dough piece (4) is kept adhesive. Therefore, the dough piece (4) always adheres to the lower roller (7) and carried forward. Thus the upper transfer roller (15) is not required and only the lower transfer roller (13) is present. One of the rollers has a surface more adhesive to the dough piece than the other roller and the dough always adheres to the roller with a more adhesive surface. Thus only one transfer roller is provided adjacent such a roller.

In this embodiment the water supply means (23) is used as means for increasing the adhesiveness of the roller surface to the dough. The same purpose is achieved by providing a rough surface or grooved surface to one of the rollers. Therefore, the dough always sticks to such a roller and is peeled off by the transfer roller.

Figure 3:
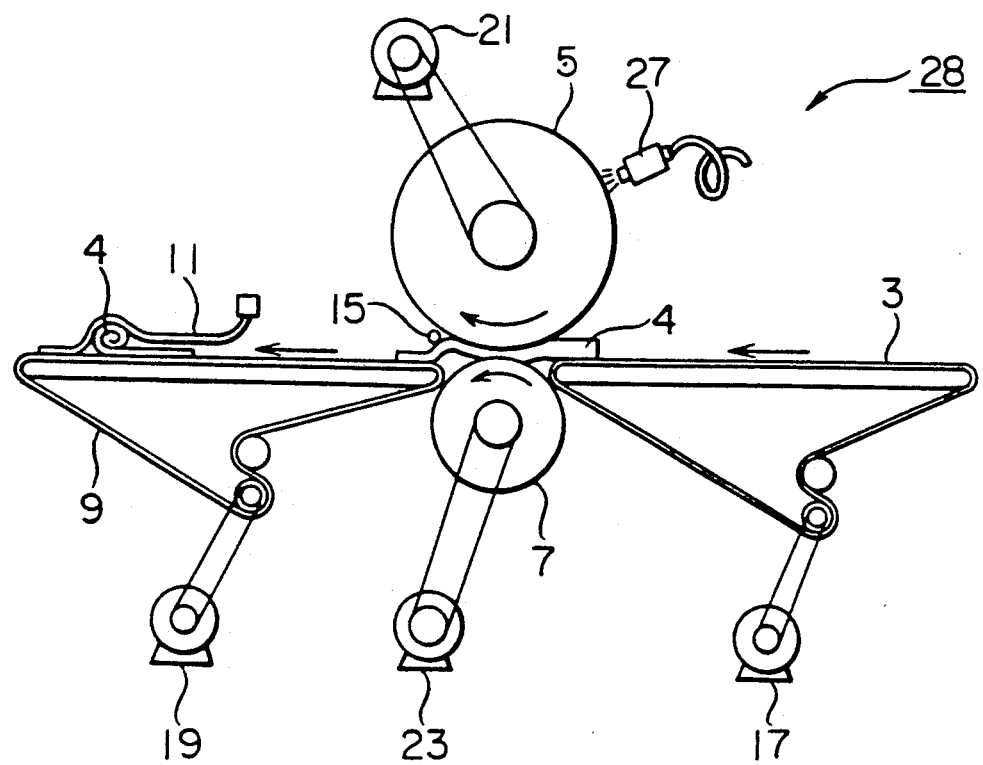
FIG. 3 shows a schematic illustration showing the feeding and rolling of dough pieces in a third embodiment of the present invention.

In FIG. 3, a third embodiment of the apparatus (28) for rolling croissant dough pieces of the present invention is shown. The members of the apparatus are the same as the members of the apparatus in FIG. 2 shown with their corresponding numbers. Also, the apparatus is the same as that in FIG. 2 except that the location of the water supply means (25) is adjacent the surface of the upper roller (5) and an upper transfer roller (15) is provided instead of the lower transfer roller (13).

In this apparatus, the upper roller (5) has a surface adhesive to the dough piece and its adhesiveness is increased by water sprayed from the water supply means (27). Since the surface of the upper roller (5) is more adhesive to the dough than that of the lower roller (7), the dough (4) always sticks to the upper roller. Accordingly, flour powder is not provided on the surface of the lower roller (7). There is no possibility that the dough (4) adheres to its surface and the dough always sticks to the upper roller and is peeled off by the upper transfter roller (15).

Figure 4:
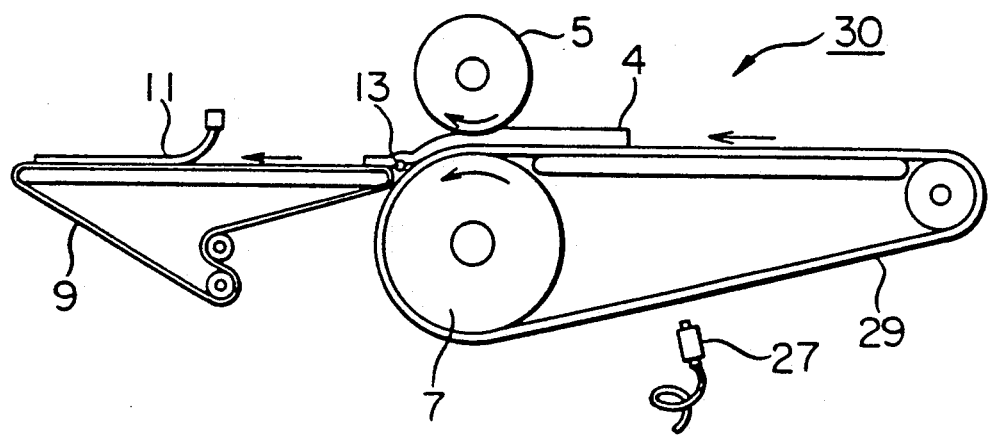
FIG. 4 shows a schematic illustration showing the feeding of dough piece in a fourth embodiment of the present invention.

In FIG. 4, a fourth embodiment of the apparatus (30) for rolling croissant dough pieces of the present invention is shown. In FIG. 4, the members with the corresponding reference numbers in FIG. 1 and FIG. 2 are the same in their construction as well as functions.

In this apparatus the lower roller (7) is wound by part of the first endless belt device (3) as a feeding endless belt device (29) and the water supply means (27) is positioned adjacent the lower flight of the first conveyor for spraying water to the surface of the first endless belt device (3). In this embodiment, the surface of the feeding endless belt (29) is more adhesive than the surface of the upper roller (5). Thus, the dough (4) always sticks to the endless belt (29) and is peeled off by the lower transfer roller (13).

As described above, a dough piece is stretched by a pair of rollers and is transferred to a rolling up device by an endless belt while maintaining adhesiveness on at least one side of the dough piece, the surfaces stick to each other thereby preventing the loosening. Additionally, the position of the croissant dough piece is adjusted to align the line from the top to the center of the base of the triangle of the dough piece with the moving direction of the upper flight of the endless belt device above which the rolling up device is provided when the dough piece is transferred from the pair of the rollers to the endless belt device via the transfer rollers, the base of the triangle of the dough piece is positioned perpendicular to the moving direction, and irregular rolls used caused by slant positioning are completely prevented. Therefore, the losses caused by errors in the automatic rolling up of the dough piece are eliminated, thus preventing loosening and irregular rolls.

I claim:

1. A method for rolling a croissant dough piece comprising the steps of
   (a) feeding a triangular dough piece, with the base of the triangle of the dough piece as the leading end and positioned perpendicular to the feeding direction, between a pair of vertically spaced apart rollers while the surface of one of said pair of rollers is maintained to be adhesive to the dough piece,
   (b) transferring said dough piece from between said pair of rollers to an endless belt device positioned downstream of said pair of rollers through a transfer roller positioned between said pair of rollers and said endless belt device rotating in the same direction of the movement of the dough piece and faster in its peripheral speed than the peripheral speed of said pair of rollers, and
   (c) rolling up said dough piece by a rolling up device positioned on said endless belt device.

2. A method for rolling a croissant dough piece, comprising the steps of
   (a) feeding a triangular dough piece, with the base of the triangle of the dough piece as the leading end and positioned perpendicular to the feeding direction, to a pair of vertically spaced apart rollers and compressing it therebetween while the surface of one of said rollers is maintained to be adhesive to the dough piece,
   (b) transferring said dough piece from between said pair of rollers through a transfer roller of a higher peripheral speed than the peripheral speeds of said pair of rollers, to an endless belt device spaced apart from said pair of rollers so that the distance between the point where said pair of rollers are the closest to each other and the upstream end of said endless belt device is shorter than the length of the dough piece measured in the feeding direction, the belt of said endless belt device moving faster than the peripheral speed of said pair of rollers, and
   (c) rolling up said dough piece on said endless belt device.

* * * * *